United States Patent Office
// 3,488,060
// Patented Jan. 6, 1970

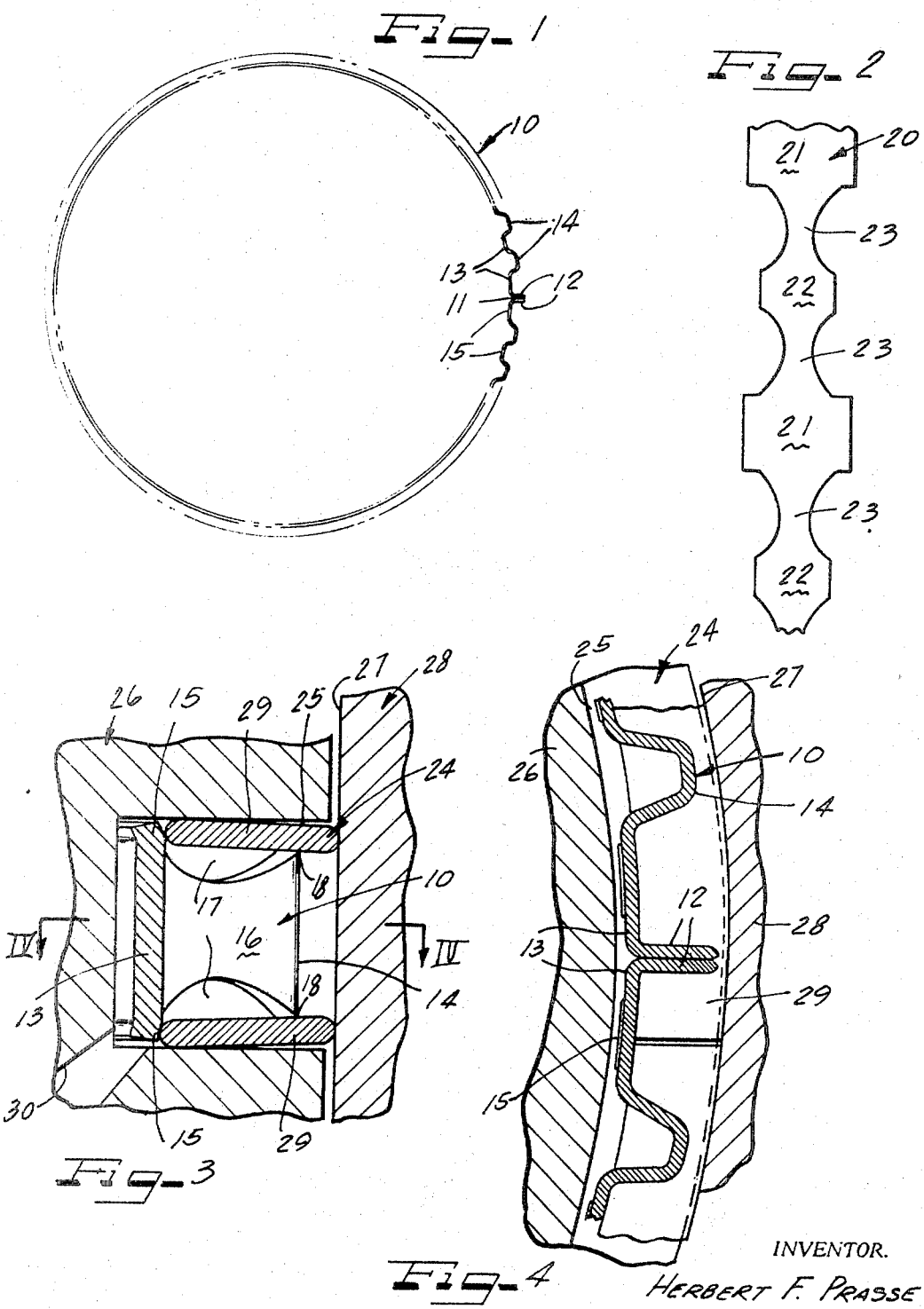
Jan. 6, 1970 — H. F. PRASSE — 3,488,060
SPLIT CIRCUMFERENTIAL EXPANDER PISTON RINGS
Filed Oct. 9, 1967 — 2 Sheets-Sheet 1
INVENTOR.
HERBERT F. PRASSE
ATTORNEYS

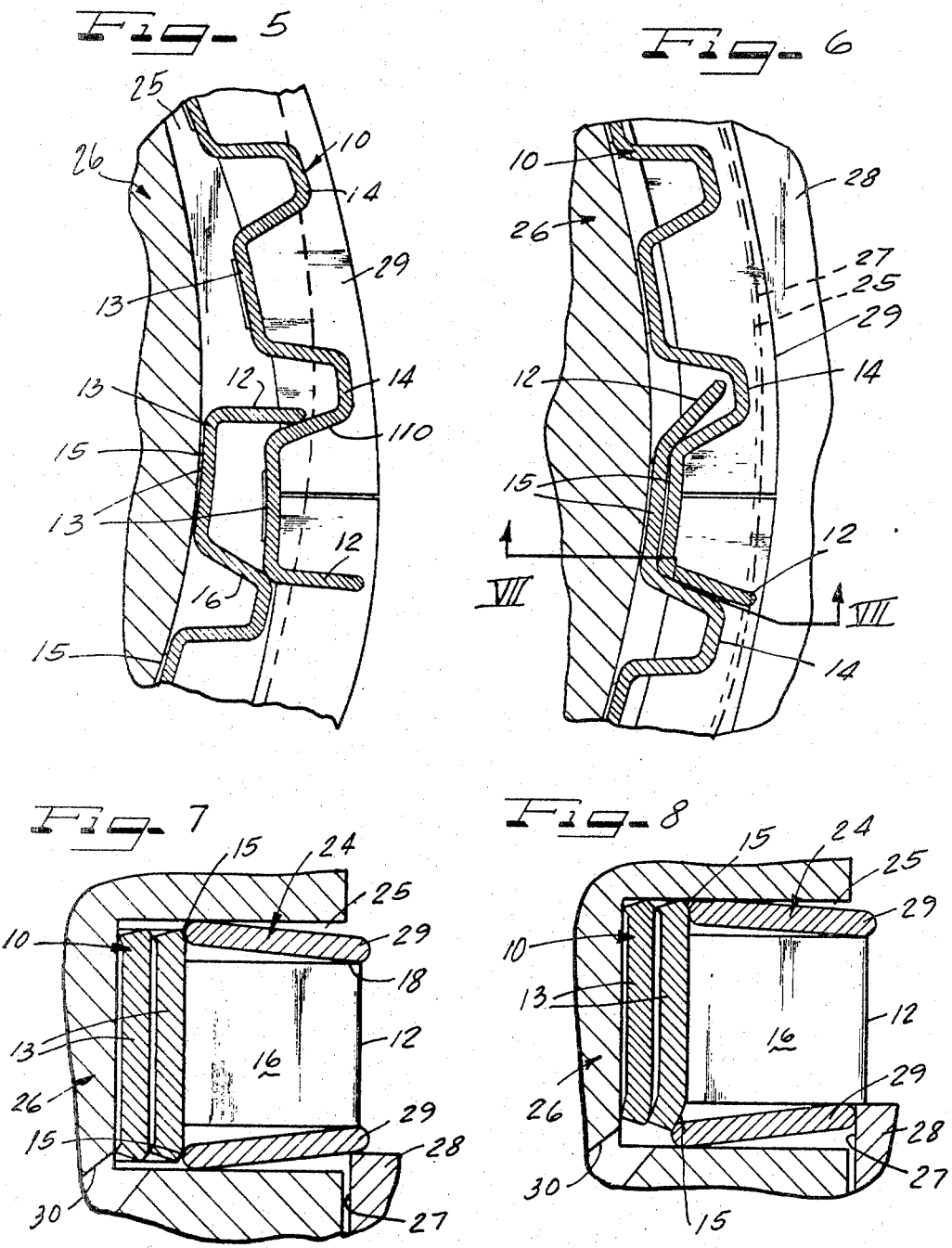

3,488,060
SPLIT CIRCUMFERENTIAL EXPANDER PISTON RINGS
Herbert F. Prasse, Town and Country, Mo., assignor to Ramsey Corporation, St. Louis, Mo., a corporation of Ohio
Filed Oct. 9, 1967, Ser. No. 673,582
Int. Cl. F16j 9/06, 15/16
U.S. Cl. 277—2
5 Claims

ABSTRACT OF THE DISCLOSURE

A split spacer-expander ring for rail ring type oil control piston ring assemblies, having end abutment tabs which will prevent installation in end-overlapped condition in a piston and cylinder. The end abutments have a radial length such that said length plus twice the thickness of the material constituting the ring is greater than the depth of the ring groove receiving the assembly, so that in the event of an end-overlapped assembly in the ring groove, it will not be possible to install the piston in the cylinder bore, because either one overlapped abutment tab or the rail rings carried by the spacer-expander will project beyond the bore of the cylinder and prevent entry of the piston into the cylinder.

BACKGROUND OF THE INVENTION

Field of the invention

The invention relates to piston ring assemblies having thin rail rings for engaging the cylinder wall of an engine, held in operative position by a split self-expanding metal ring which exerts expansion forces around the entire circumference of the thin rings supported thereby. The ring assemblies are useful as oil control piston rings. To function properly, the split spacer-expander ring must have its ends in abutting relation.

Description of the prior art

Spacer-expander rings for thin rail oil control piston ring assemblies are known for example in the Melvin W. Marien U.S. Patent 2,744,803, issued May 8, 1956. The ends of these rings had abutment tabs which could slide over each other and permit nesting of the overlapped ends of the ring, without preventing installation of the assembly in the engine cylinder.

SUMMARY OF THE INVENTION

The present invention now prevents installation of thin rail and spacer-expander assemblies in an engine cylinder if the ends of the spacer-expander ring are overlapped. The safety feature of this invention avoids installation mistakes by making it impossible for even the most careless assembler or automated installation equipment to force an assembly with an overlapped spacer-expander ring into the engine cylinder. This is accomplished by providing radially extending tabs on the split ends of the spacer-expander ring, which are so dimensioned that one of the tabs will project beyond the bore of the cylinder to prevent installation of the piston in the cylinder, even though the overlapped ends of the ring are mashed down into the bottom of the ring groove. If the rail rings continue to be engaged by the overlapped ends of the mashed-down spacer-expander, they will project sufficiently beyond the piston to prevent installation of the piston into the engine cylinder. If a rail ring should ride over the mashed-down overlapped ends of the spacer-expander, so as to be jammed into the ring groove sufficiently for permitting entry of the piston into the engine cylinder, then one of the abutment tabs will project beyond the engine cylinder bore to prevent entry of the piston into the bore.

The end tabs, according to this invention, are dimensioned so that their length plus twice the thickness of the material constituting the spacer-expander ring will be greater than the depth of the ring groove, but less than the radial width of the rail ring. With these parameters, the end tabs will not project beyond the rail rings when the tabs are in proper abutted relation, will create an easily visible deformation of the spacer-expander as they ride over each other as the ends are overlapped, and will prevent entry of the assembly into the engine cylinder even when the overlapped ends are mashed down into the bottom of the ring groove.

In a preferred embodiment, the spacer-expander is of the radially corrugated sheet metal type, with inclined lips on the inner corrugations or legs for engaging the inner peripheries of the rail ring, and with tabs on the outer corrugations or humps supporting the rail rings in axially spaced relation. In this preferred embodiment, the end abutment tabs extend radially outward from the inner corrugations and are longer than the humps of the corrugated ring to project beyond the outer periphery of the ring, without however projecting beyond the rail rings that are supported thereon, and engaged by the lips.

An object of the invention therefore is to provide a rail ring type oil control ring for pistons, having a split spacer-expander which cannot be installed in an engine cylinder if the split ends of the spacer-expander are overlapped.

Another object of this invention is to provide an oil control ring with a circumferentially expanding spacer ring that will not fit into an engine cylinder unless the assembly is properly installed in the oil ring groove of a piston to be fitted in the cylinder.

A still further object of this invention is to provide a split spacer-expander piston ring with end abutments which will prevent improper assembly of the ring in a piston and engine cylinder assembly.

A specific object of this invention is to provide a split radially corrugated sheet metal, spacer-expander piston ring, with radially extending end abutment tabs longer than the humps of the corrugations.

Other and further objects and features of this invention will be apparent to those skilled in this art, from the following detailed descriptions.

BRIEF DESCRIPTION OF THE DRAWING

FIGURE 1 is a plan view of a corrugated sheet metal spacer-expander with elongated abutment end tabs according to this invention.

FIGURE 2 is a fragmentary plan view of a ribbon of metal from which the corrugated ring of FIGURE 1 is formed, showing the shape and succession of the portions to form the corrugations.

FIGURE 3 is an enlarged, fragmentary cross-sectional view of a piston and cylinder assembly with an oil control ring in the piston ring groove including the spacer-expander ring of FIGURE 1.

FIGURE 4 is a fragmentary cross-sectional view taken along the line IV—IV of FIGURE 3, illustrating the normal operating position of the end abutment tabs of the spacer-expander ring of this invention.

FIGURE 5 is a view similar to FIGURE 4, but illustrating the projection of the spacer-expander and a rail ring carried thereby, when the ends of the expander are overlapped.

FIGURE 6 is a view similar to FIGURE 5, but showing the position of the parts when the overlapped ends of the expander are jammed into the bottom of the ring groove.

FIGURE 7 is a cross-sectioanl view of the jammed assembly of FIGURE 6, illustrating the manner in which entry of the piston into the cylinder bore is prevented.

FIGURE 8 is a view similar to FIGURE 7, but illustrating the manner in which an end tab of the jammed ring assembly of FIGURES 6 and 7 will prevent entry of the piston into the cylinder, even when the rail ring overrides the spacer-expander.

DESCRIPTION OF THE PREFERRED EMBODIMENTS

The spacer-expander piston ring 10, of FIGURE 1, is a split circular ring of sheet metal such as steel. The split ring 10 has the split end 11 thereof closed by abutted-together, radially-extending abutment tabs 12. The corrugations of the ring 10 include circumferentially-spaced, radially inner corrugations or base legs 13 alternating with humps or outwardly projecting corrugations 14. The top and bottom sides of the inner corrugations 13 have inclined lips or tabs 15 projecting axially outwardly and radially inward therefrom as best shown in FIGURE 3. The outer corrugations 14 connect with the inner corrugations 13 through scalloped side legs 16 which provide oil drainage gaps 17 as shown in FIGURE 3. The outer corrugations 14 crest to support surfaces 18 for the rail rings.

The ring 10 is formed from a ribbon or strip of resilient metal such as spring steel 20, as shown in FIGURE 2, and this strip is cut to the shape illustrated. As shown in FIGURE 2, the strip 20 has full-width portions 21 alternating with narrower width portions 22 and connected thereto by scalloped legs 23. The portions 21 form the inner corrugations 13, the portions 22 form the outer corrugations 14, and the scalloped portions 23 form the legs 16 of the corrugated ring.

The ring 10 as shown in FIGURES 3 and 4 is used in an oil groove piston ring assembly 24 in the oil ring groove 25 of an engine piston 26, reciprocally mounted in the bore 27 of an engine cylinder 28. The spacer-expander 10 radially expands and axially supports a pair of split thin metal rail rings 29 with the inner peripheries of the rings engaged by the lips 15 and the outer peripheral portions of the rings supported by the surfaces 18. The inclined lips 15 dish the rings 29 into side sealing engagement with the side walls of the oil ring groove 25. With the abutment tabs 12 of the ring 10 abutted together as shown in FIGURE 4 and the ring 10 pressed circumferentially in the ring groove 25, the spacer-expander acts as a circumferential spring and urges the rail rings 29 against the bore 27 while at the same time dishing them into side sealing relation with the side walls of the ring groove 25 and supporting them in axially spaced relation. It will be noted that the compressed circumferential expander ring 10 does not bottom on the ring groove, being spaced from the bottom of the groove.

The assembly 24 functions to control lubrication of the cylinder bore 27, and oil can drain freely from between the rail rings 29 into the oil groove 25 and out through drainage holes such as 30 in the piston 26.

It will also be noted from FIGURE 4 that while the abutting end tabs 12 project radially beyond the humps or corrugations 14 of the ring 10, they terminate short of the outer periphery of the rail rings 29, so as to be out of engagement with the bore 27.

As shown in FIGURE 5, in order for the split ends of the ring 10 to overlap, one of the tabs 12 must ride up and over the other tab 12, and the partial nesting of the overlapped ends will leave this one tab 12 projecting radially well beyond the ring groove 25. This distortion of the ring 10 is at once apparent to the assembler and can be easily corrected. If the rail ring 29 continues to ride on the overlapped end of the ring 10, it of course will extend far beyond the piston 26 and even beyond the end of the projecting tab 12. Under these conditions, of course, the piston ring assembly would not fit into the bore 27.

As shown in FIGURE 6, if the assembler deliberately mashes down the overlapped ends of the ring from the partially nested position of FIGURE 5 into a fully nested position, the inner end tab 12 will of course have to be deformed to fit into the recess provided by the outer corrugation or hump 14, and the inner corrugation 15 of the overlapped end will bottom on the inner corrugation of the end portion that is overlapped as illustrated. In this mashed-down, fully nested, overlapping position, the outer tab 12 still projects well beyond the outer corrugations 14.

In the event the rail rings 29 continue to be supported on the overlapped ends of the spacer-expander 10, even in the mashed down position of FIGURE 6, and continue to be engaged by the lips 15 of the overlapped end, the rings will project beyond the piston to such an extent as not to fit in the bore 27 as shown in FIGURE 7. This of course will prevent entry of the piston into the cylinder, even though the ring 10 is bottomed on the bottom of the ring groove, as shown in FIGURE 7.

In the event one or both of the rail rings 29 can be jammed sufficiently to ride over the lips 15 of the overlapped end of the ring 10, then the overlapping tab 12 will project beyond the ring groove sufficiently to prevent entry into the engine cylinder as illustrated in FIGURE 8, even when the ring 10 is fully bottomed in the bottom of the ring groove.

It will therefore be understood that the abutment tabs 12 prevent improper installation of the piston ring assembly 24 in an engine.

The abutment tabs 12 to perform their function without interfering with the normal operation of the oil ring assembly 24, should have a length such that this length plus twice the thickness of the ring 10 is greater than the depth of the ring groove 25. However, the tabs 12 must also be of less radial length than the radial width of the rail rings 29, so that they cannot scrape against the bore 27. Then, under these conditions, as illustrated in FIGURE 6, even though the overlapped ends of the ring 10 are mashed down to fully nest the inner corrugations 13, and to bottom the ring 10 in the ring groove, the overlying end tab 12 will be effective to prevent installation of the assembly in the engine bore.

The following are preferred dimensions for the installations of this invention:

| | Inch |
|---|---|
| Ring groove depth | .180 |
| Rail ring width | .145 |
| Metal thickness of spacer-expander ring | .025 |
| Length of tabs | .139 |

In such an assembly, the ring bottom clearance is .010 inch, and the rails project beyond the ends of the tabs .006 inch. Then, if the assembly is bottomed in the ring groove and the ends of the spacer-expander are overlapped and fully nested as illustrated in FIGURE 6, the length of the tabs plus twice the thickness of the spacer-expander metal will be .189 inch, or greater than the ring groove depth, and sufficient to prevent installation of the overlapped assembly in the engine bore.

In assemblies using the preferred illustrated corrugated spacer-expanded ring, the rail rings preferably overlie the outer corrugations or humps 14 about .025 to .035 inch, and overlie the end abutments 12 about .006 to .010 inch. This readily accommodates wear of the cylinder wall engaging edges of the rail rings during use. These edges may be coated with hard metal such as chromium.

From the above description, it will therefore be understood that oil ring assemblies embodying spacer-expanders according to this invention cannot be installed in an engine cylinder when they are improperly assembled in the oil ring groove of a piston to be received in this cylinder. The invention therefore eliminates a heretofore encountered serious problem in automated engine assembly lines and human errors in manual installations.

I claim as my invention:

1. A split expander ring for a rail ring type piston ring assembly which assembly is mounted in a ring groove of a piston to seal against a cylinder receiving the piston and which cannot be installed in the ring groove and fit in the cylinder when the expander ring is in end-overlapped condition comprising a split resilient ring having end abutments of a radial length such that said length plus twice the thickness of the material constituting the ring is greater than the depth of the ring groove receiving the assembly, whereby in the event of end-overlapped assembly in a piston ring groove, at least one abutment will project radially beyond the cylinder bore to prevent entry of the piston into the bore.

2. An oil control piston ring assembly for mounting in a piston ring groove comprising a pair of split thin metal rail rings, a circumferential spacer-expander between said rings having end edges supporting the rings in axially spaced relation and inclined tabs engaging the inner peripheries of the rail rings to expand the rings, said spacer-expander being split and having out-turned abutting tabs of a radial length such that said length plus twice the thickness of the material of the spacer-expander, is greater than the depth of the ring groove in which the assembly is to be received but less than the radial width of said rail rings, whereby said assembly cannot be positioned in a piston ring groove with the ends of the spacer-expander overlapped, without one of said tabs projecting sufficiently beyond the piston to prevent entry of the piston into a cylinder sized for receiving the piston.

3. A spacer-expander ring for a rail ring type oil control piston ring assembly mounted in a piston ring groove without bottoming on the bottom of the ring groove which comprises a split circumferentially expansible and contractible radially corrugated ring dimensioned to fit entirely within the piston ring groove when its ends are abutted and having outer corrugations for axially supporting thin split rail rings in axially spaced relation and inner corrugations with axially extending lips spaced circumferentially around the inner periphery of the ring for engaging the outer peripheries of the rail rings supported on said outer corrugations to expand said rail rings, and radially directed abutment tabs on the split ends of said circumferentially expansible and contractible ring having sufficient length to project from the ring groove receiving the assembly whenever the split ends of said expansible and contractible ring are overlapped even though said expansible and contractible ring is bottomed on the bottom of the ring groove, the inner corrugations of the overlapped spacer-expander ring are fully nested to permit the outer periphery of the said spacer-expander ring to fit entirely within the ring groove, and rail rings supported on said spacer-expander ring slide radially inward over said lips to lie within the ring groove.

4. In combination a piston having a ring groove around the periphery thereof, a split spring metal ring in said ring groove having radially extending corrugations around the periphery thereof and outturned abutment tabs on the ends thereof, said split metal ring having a radial depth less than the depth of said ring groove, said abutment tabs having a radial length greater than the radial length of said corrugations and being such that said length plus twice the thickness of the metal constituting said ring is greater than the depth of the ring groove whereby in the event said split ends are overlapped and a portion of the ring bottomed on the ring groove, at least one abutment tab will project radially beyond the piston.

5. The split metal ring of claim 4 wherein said tabs cooperate with said corrugations to prevent nesting of the overlapped ends of the ring without flattening the underlying tab of the overlapped ends.

References Cited

UNITED STATES PATENTS 3,166,331   1/1965   Warrick  ---------- 277—139
3,338,582   8/1967   De Bruin  ---------- 277—2

SAMUEL ROTHBERG, Primary Examiner

U.S. Cl. X.R.
267—1.5; 277—141